(12) United States Patent
Mansharof (10) Patent No.: US 11,415,812 B2
(45) Date of Patent: Aug. 16, 2022

(54) COMPACT COLLIMATING OPTICAL DEVICE AND SYSTEM

(71) Applicant: LUMUS LTD., Ness Ziona (IL)

(72) Inventor: Mali Mansharof, Mazkert-Batya (IL)

(73) Assignee: LUMUS LTD., Ness Ziona (IL)

( * ) Notice: Subject to any disclaimer, the term of this patent is extended or adjusted under 35 U.S.C. 154(b) by 411 days.

(21) Appl. No.: 16/449,544

(22) Filed: Jun. 24, 2019

(65) Prior Publication Data

US 2019/0391408 A1 Dec. 26, 2019

Related U.S. Application Data

(60) Provisional application No. 62/689,900, filed on Jun. 26, 2018.

(51) Int. Cl.
*G02B 27/30* (2006.01)
*G02B 27/28* (2006.01)
(Continued)

(52) U.S. Cl.
CPC .............. *G02B 27/30* (2013.01); *G02B 5/04* (2013.01); *G02B 6/0025* (2013.01); *G02B 27/283* (2013.01); *G02B 27/288* (2013.01)

(58) Field of Classification Search
CPC ........ G02B 27/30; G02B 5/04; G02B 6/0025; G02B 27/283; G02B 27/288;
(Continued)

(56) References Cited

U.S. PATENT DOCUMENTS

| 2,748,659 A | 6/1956 | Geffcken et al. |
| 2,958,258 A | 11/1960 | Kelly |

(Continued)

FOREIGN PATENT DOCUMENTS

| BE | 357371 | 2/1929 |
| CN | 1606712 | 4/2005 |

(Continued)

OTHER PUBLICATIONS

Lenses and Simple Optics, http://www.nightlase.com.au/education/optics/index.html (Year: 2004).

*Primary Examiner* — Marin Pichler
(74) *Attorney, Agent, or Firm* — Mark M. Friedman (57) ABSTRACT

An optical system includes an arrangement of optical components including a first polarization-selective reflector (PSR) associated with a third surface of a first prism. The first prism includes an entrance surface having a normal corresponding to a first rectangular axis of the first PSR. The first prism includes a second surface perpendicular to the entrance surface, and has a normal corresponding to a second rectangular axis of the first PSR. The arrangement of optical components defines a light path propagating toward the first PSR, traversing the first PSR, then traversing in a first direction a second PSR, and then reflecting from a second direction from the second PSR in an output image direction. The second PSR is inclined with respect to the first PSR so the output image direction is oblique to the first and second rectangular axes of the first PSR.

12 Claims, 5 Drawing Sheets

(51) Int. Cl.
    *G02B 5/04*         (2006.01)
    *F21V 8/00*        (2006.01)

(58) Field of Classification Search
    CPC .............. G02B 5/3058; G02B 17/0856; G02B
                  27/0172; G02B 26/0816; G02B 27/01;
                  G02B 27/0101; G02B 27/0149; G02B
                  27/017; G02B 27/0176; G02B 27/0179;
                            G02B 2027/0181–0187
    USPC ............ 359/483.01–484.06, 485.01, 485.06,
                 359/485.07, 486.01–494.01, 13–14,
                 359/629–633; 362/19; 385/11; 349/11,
                 349/96–103, 194; 345/7–9; 348/115
    See application file for complete search history.

(56) References Cited

U.S. PATENT DOCUMENTS

| | | | |
|---|---|---|---|
| 3,626,394 A | 12/1971 | Nelson et al. | |
| 3,658,405 A | 4/1972 | Pluta | |
| 3,667,621 A | 6/1972 | Barlow | |
| 3,677,621 A | 7/1972 | Smith | |
| 3,737,212 A | 6/1973 | Antonson et al. | |
| 3,873,209 A | 3/1975 | Schinke et al. | |
| 3,940,204 A | 2/1976 | Withrington | |
| 4,233,526 A | 11/1980 | Kurogi et al. | |
| 4,240,738 A | 12/1980 | Praamsma | |
| 4,309,070 A | 1/1982 | St Leger Searle | |
| 4,331,387 A | 5/1982 | Wentz | |
| 4,372,639 A | 2/1983 | Johnson | |
| 4,383,740 A | 5/1983 | Bordovsky | |
| 4,613,216 A | 9/1986 | Herbec et al. | |
| 4,755,667 A | 7/1988 | Marsoner et al. | |
| 4,775,217 A | 10/1988 | Ellis | |
| 4,799,765 A | 1/1989 | Ferrer | |
| 4,932,743 A | 6/1990 | Isobe et al. | |
| 5,033,828 A | 7/1991 | Haruta | |
| 5,076,664 A | 12/1991 | Migozzi | |
| 5,208,800 A | 5/1993 | Isobe et al. | |
| 5,235,589 A | 8/1993 | Yokomori et al. | |
| 5,278,532 A | 1/1994 | Hegg et al. | |
| 5,301,067 A | 4/1994 | Bleier et al. | |
| 5,369,415 A | 11/1994 | Richard et al. | |
| 5,430,505 A | 7/1995 | Katz | |
| 5,453,877 A | 9/1995 | Gerbe et al. | |
| 5,481,385 A | 1/1996 | Zimmerman et al. | |
| 5,499,138 A | 3/1996 | Iba | |
| 5,537,260 A | 7/1996 | Williamson | |
| 5,539,578 A | 7/1996 | Togino et al. | |
| 5,555,329 A | 9/1996 | Kuper et al. | |
| 5,594,830 A | 1/1997 | Winston et al. | |
| 5,619,601 A | 4/1997 | Akashi et al. | |
| 5,650,873 A | 7/1997 | Gal et al. | |
| 5,680,209 A | 10/1997 | Maechler | |
| 5,708,449 A | 1/1998 | Heacock et al. | |
| 5,712,694 A | 1/1998 | Taira et al. | |
| 5,751,480 A | 5/1998 | Kitagishi | |
| 5,764,412 A | 6/1998 | Suzuki et al. | |
| 5,808,709 A | 9/1998 | Davis | |
| 5,808,800 A | 9/1998 | Handschy | |
| 5,896,232 A | 4/1999 | Budd et al. | |
| 5,909,325 A | 6/1999 | Kuba et al. | |
| 5,966,223 A | 10/1999 | Amitai et al. | |
| 5,999,836 A | 12/1999 | Nelson | |
| 6,007,225 A | 12/1999 | Ramer et al. | |
| 6,021,239 A | 2/2000 | Minami et al. | |
| 6,034,750 A | 3/2000 | Rai et al. | |
| 6,154,321 A | 11/2000 | Melville et al. | |
| 6,204,975 B1 | 3/2001 | Watters et al. | |
| 6,222,676 B1 | 4/2001 | Togino et al. | |
| 6,222,971 B1 | 4/2001 | Veligdan et al. | |
| 6,239,092 B1 | 5/2001 | Papasso et al. | |
| 6,256,151 B1 | 7/2001 | Ma et al. | |
| 6,264,328 B1 | 7/2001 | Williams et al. | |
| 6,266,108 B1 | 7/2001 | Bao | |
| 6,307,612 B1 | 10/2001 | Smith | |
| 6,310,713 B2 | 10/2001 | Doany et al. | |
| 6,324,330 B1 | 11/2001 | Stites | |
| 6,349,001 B1 | 2/2002 | Spitzer | |
| 6,362,861 B1 | 3/2002 | Hertz et al. | |
| 6,400,493 B1 | 6/2002 | Mertz et al. | |
| 6,404,550 B1 | 6/2002 | Yajima | |
| 6,406,149 B2 | 6/2002 | Okuyama | |
| 6,433,339 B1 | 8/2002 | Maeda et al. | |
| 6,490,087 B1 | 12/2002 | Fulkerson et al. | |
| 6,490,104 B1 | 12/2002 | Gleckman et al. | |
| 6,509,982 B2 | 1/2003 | Steiner | |
| 6,542,307 B2 | 4/2003 | Gleckman et al. | |
| 6,580,529 B1 | 6/2003 | Amitai et al. | |
| 6,606,173 B2 | 8/2003 | Kappel et al. | |
| 6,671,100 B1 | 12/2003 | McRuer | |
| 6,690,513 B2 | 2/2004 | Hulse et al. | |
| 6,704,052 B1 | 3/2004 | Togino et al. | |
| 6,704,065 B1 | 3/2004 | Sharp et al. | |
| 6,825,987 B2 | 11/2004 | Repetto et al. | |
| 6,829,095 B2 | 12/2004 | Amitai | |
| 6,879,443 B2 | 4/2005 | Spitzer et al. | |
| 6,880,931 B2 | 4/2005 | Moliton et al. | |
| 6,894,821 B2 | 5/2005 | Kotchick | |
| 6,950,220 B2 | 9/2005 | Abramson et al. | |
| 7,021,777 B2 | 4/2006 | Amitai | |
| 7,025,464 B2 | 4/2006 | Beeson et al. | |
| 7,163,291 B2 | 1/2007 | Cado et al. | |
| 7,285,903 B2 | 10/2007 | Cull et al. | |
| 7,339,742 B2 | 3/2008 | Amitai et al. | |
| 7,391,573 B2 | 6/2008 | Amitai | |
| 7,392,917 B2 | 7/2008 | Alalu et al. | |
| 7,405,881 B2 | 7/2008 | Shimizu et al. | |
| 7,418,170 B2 | 8/2008 | Mukawa et al. | |
| 7,448,170 B2 | 11/2008 | Skendzic et al. | |
| 7,457,040 B2 | 11/2008 | Amitai | |
| 7,554,737 B2 | 6/2009 | Knox et al. | |
| 7,576,916 B2 | 8/2009 | Amitai | |
| 7,576,918 B2 | 8/2009 | Goggins | |
| 7,577,326 B2 | 8/2009 | Amitai | |
| 7,643,214 B2 | 1/2010 | Amitai | |
| 7,672,055 B2 | 3/2010 | Amitai | |
| 7,710,655 B2 | 5/2010 | Freeman et al. | |
| 7,724,441 B2 | 5/2010 | Amitai | |
| 7,724,442 B2 | 5/2010 | Amitai | |
| 7,724,443 B2 | 5/2010 | Amitai | |
| 7,778,508 B2 | 8/2010 | Hirayama | |
| 7,884,985 B2 | 2/2011 | Amitai | |
| 7,949,252 B1 | 5/2011 | Georgiev | |
| 7,995,275 B2 | 8/2011 | Maeda et al. | |
| 8,000,020 B2 | 8/2011 | Amitai | |
| 8,004,765 B2 | 8/2011 | Amitai | |
| 8,035,872 B2 | 10/2011 | Ouchi | |
| 8,098,439 B2 | 1/2012 | Amitai et al. | |
| 8,187,481 B1 | 5/2012 | Hobbs | |
| 8,432,614 B2 | 4/2013 | Amitai | |
| 8,472,119 B1 | 6/2013 | Kelly | |
| 8,643,948 B2 | 2/2014 | Amitai et al. | |
| 8,655,178 B2 | 2/2014 | Capron et al. | |
| 8,665,178 B1 | 3/2014 | Wang | |
| 8,718,437 B2 | 5/2014 | Coe-Sullivan et al. | |
| 8,783,893 B1 | 7/2014 | Seurin et al. | |
| 8,786,519 B2 | 7/2014 | Blumenfeld et al. | |
| 8,810,914 B2 | 8/2014 | Amitai et al. | |
| 8,854,734 B2 | 10/2014 | Ingram | |
| 8,861,081 B2 | 10/2014 | Amitai et al. | |
| 8,873,148 B1 | 10/2014 | Gupta et al. | |
| 8,902,503 B2 | 12/2014 | Amitai et al. | |
| 8,913,865 B1 | 12/2014 | Bennett | |
| 8,988,776 B2 | 3/2015 | Weber et al. | |
| 9,025,253 B2 | 5/2015 | Hadad et al. | |
| 9,069,180 B2 | 6/2015 | Amitai et al. | |
| 9,104,036 B2 | 8/2015 | Amitai et al. | |
| 9,170,425 B1 | 10/2015 | Harrison et al. | |
| 9,207,457 B2 | 12/2015 | Amitai | |
| 9,248,616 B2 | 2/2016 | Amitai | |
| 9,279,986 B2 | 3/2016 | Amitai | |
| 9,316,832 B2 | 4/2016 | Amitai et al. | |
| 9,417,453 B2 | 8/2016 | Amitai et al. | |

(56) References Cited

U.S. PATENT DOCUMENTS

| | | |
|---|---|---|
| 9,448,408 B2 | 9/2016 | Amitai et al. |
| 9,488,840 B2 | 11/2016 | Mansharof et al. |
| 9,500,869 B2 | 11/2016 | Amitai |
| 9,513,481 B2 | 12/2016 | Levin et al. |
| 9,523,852 B1 | 12/2016 | Brown et al. |
| 9,541,762 B2 | 1/2017 | Mukawa et al. |
| 9,551,880 B2 | 1/2017 | Amitai |
| 9,568,738 B2 | 2/2017 | Mansharof et al. |
| 9,664,910 B2 | 5/2017 | Mansharof et al. |
| 9,709,809 B2 | 7/2017 | Miyawaki et al. |
| 9,740,013 B2 | 8/2017 | Amitai et al. |
| 9,766,459 B2 | 9/2017 | Alton et al. |
| 9,798,061 B2 | 10/2017 | Hsiao et al. |
| 9,804,396 B2 | 10/2017 | Amitai |
| 9,805,633 B2 | 10/2017 | Zheng |
| 9,910,283 B2 | 3/2018 | Amitai |
| 10,048,499 B2 | 8/2018 | Amitai |
| 10,222,535 B2 | 3/2019 | Remhof et al. |
| 10,302,835 B2 | 5/2019 | Danziger |
| 10,302,957 B2 | 5/2019 | Sissom |
| 10,564,430 B2 | 2/2020 | Amitai et al. |
| 10,571,699 B1 | 2/2020 | Parsons et al. |
| 2001/0013972 A1 | 8/2001 | Doany et al. |
| 2001/0030860 A1 | 10/2001 | Kimura et al. |
| 2001/0055152 A1 | 12/2001 | Richards |
| 2002/0008708 A1 | 1/2002 | Weiss et al. |
| 2002/0015233 A1 | 2/2002 | Park |
| 2002/0021498 A1 | 2/2002 | Ohtaka |
| 2002/0080615 A1 | 6/2002 | Marshall et al. |
| 2002/0080622 A1 | 6/2002 | Pashley et al. |
| 2002/0085281 A1 | 7/2002 | Okabe |
| 2002/0176173 A1 | 11/2002 | Song |
| 2002/0186179 A1 | 12/2002 | Knowles |
| 2003/0007157 A1 | 1/2003 | Hulse et al. |
| 2003/0030912 A1 | 2/2003 | Gleckman et al. |
| 2003/0090439 A1 | 5/2003 | Spitzer et al. |
| 2003/0165017 A1 | 9/2003 | Amitai |
| 2003/0218718 A1 | 11/2003 | Moliton et al. |
| 2004/0032660 A1 | 2/2004 | Amitai |
| 2004/0033528 A1 | 2/2004 | Amitai |
| 2004/0080718 A1 | 4/2004 | Kojima |
| 2004/0085649 A1 | 5/2004 | Repetto et al. |
| 2004/0130797 A1 | 7/2004 | Leigh Travis |
| 2004/0136082 A1 | 7/2004 | Cado et al. |
| 2004/0137189 A1 | 7/2004 | Tellini et al. |
| 2004/0145814 A1 | 7/2004 | Rogers |
| 2004/0218271 A1 | 11/2004 | Hartmaier et al. |
| 2004/0263842 A1 | 12/2004 | Puppels et al. |
| 2004/0264185 A1 | 12/2004 | Grotsch et al. |
| 2005/0023545 A1 | 2/2005 | Camras et al. |
| 2005/0024849 A1 | 2/2005 | Parker et al. |
| 2005/0073577 A1 | 4/2005 | Sudo |
| 2005/0078388 A1 | 4/2005 | Amitai |
| 2005/0083592 A1 | 4/2005 | Amitai |
| 2005/0084210 A1 | 4/2005 | Cha |
| 2005/0173719 A1 | 8/2005 | Yonekubo et al. |
| 2005/0174658 A1 | 8/2005 | Long et al. |
| 2005/0180687 A1 | 8/2005 | AMitai |
| 2005/0225866 A1 | 10/2005 | Abu Ageel |
| 2005/0265044 A1 | 12/2005 | Chen et al. |
| 2006/0012842 A1 | 1/2006 | Abu-Ageel |
| 2006/0091784 A1 | 5/2006 | Conner et al. |
| 2006/0126182 A1 | 6/2006 | Levola |
| 2006/0146518 A1 | 7/2006 | Dubin |
| 2006/0153518 A1 | 7/2006 | Abu AGeel et al. |
| 2006/0228073 A1 | 10/2006 | Mukawa |
| 2006/0268421 A1 | 11/2006 | Shimizu et al. |
| 2007/0035706 A1 | 2/2007 | Margulis |
| 2007/0052929 A1 | 3/2007 | Allman et al. |
| 2007/0070859 A1 | 3/2007 | Hirayama et al. |
| 2007/0091445 A1 | 4/2007 | Amitai |
| 2007/0097513 A1 | 5/2007 | Amitai |
| 2007/0153344 A1 | 7/2007 | Lin |
| 2007/0159673 A1 | 7/2007 | Freeman et al. |
| 2007/0165192 A1 | 7/2007 | Prior et al. |
| 2007/0206390 A1 | 9/2007 | Brukilacchio et al. |
| 2007/0284565 A1 | 12/2007 | Leatherdale et al. |
| 2007/0291491 A1 | 12/2007 | Li et al. |
| 2008/0013051 A1 | 1/2008 | Glinski et al. |
| 2008/0025667 A1 | 1/2008 | Amitai |
| 2008/0030974 A1 | 2/2008 | Abu-Ageel |
| 2008/0062686 A1 | 3/2008 | Hoelen et al. |
| 2008/0068852 A1 | 3/2008 | Goihl |
| 2008/0106775 A1 | 5/2008 | Amitai et al. |
| 2008/0151375 A1 | 6/2008 | Lin |
| 2008/0151379 A1 | 6/2008 | Amitai |
| 2008/0186604 A1 | 8/2008 | Amitai |
| 2008/0192239 A1 | 8/2008 | Otosaka |
| 2008/0198471 A1 | 8/2008 | Amitai |
| 2008/0198604 A1 | 8/2008 | Kim et al. |
| 2008/0278812 A1 | 11/2008 | Amitai |
| 2008/0285140 A1 | 11/2008 | Amitai |
| 2008/0316606 A1 | 12/2008 | Inoguchi et al. |
| 2009/0009719 A1 | 1/2009 | Ryf |
| 2009/0010023 A1 | 1/2009 | Kanade et al. |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2009/0165017 A1 | 6/2009 | Syed et al. |
| 2009/0275157 A1 | 11/2009 | Winberg et al. |
| 2010/0002465 A1 | 1/2010 | Tsang et al. |
| 2010/0020291 A1 | 1/2010 | Kasazumi et al. |
| 2010/0027289 A1 | 2/2010 | Aiki et al. |
| 2010/0046234 A1 | 2/2010 | Abu-Ageel |
| 2010/0053148 A1 | 3/2010 | Khazeni et al. |
| 2010/0067110 A1* | 3/2010 | Hadad ................ G02B 27/0172 359/485.06 |
| 2010/0171680 A1 | 7/2010 | Lapidot et al. |
| 2010/0202048 A1* | 8/2010 | Amitai ................ G02B 27/145 359/485.02 |
| 2010/0202128 A1 | 8/2010 | Saccomanno |
| 2010/0202129 A1 | 8/2010 | Abu-Ageel |
| 2010/0214635 A1 | 8/2010 | Sasaki et al. |
| 2010/0278480 A1 | 11/2010 | Vasylyev |
| 2010/0290124 A1 | 11/2010 | Tohara |
| 2010/0291489 A1 | 11/2010 | Moskovits et al. |
| 2011/0007243 A1 | 1/2011 | Tanaka |
| 2011/0010988 A1 | 1/2011 | Lanoha |
| 2011/0013245 A1 | 1/2011 | Tanaka |
| 2011/0019250 A1 | 1/2011 | Aiki et al. |
| 2011/0050595 A1 | 3/2011 | Lundback et al. |
| 2011/0096566 A1 | 4/2011 | Tsai et al. |
| 2011/0149547 A1 | 6/2011 | Bruzzone et al. |
| 2011/0176218 A1 | 7/2011 | Noui |
| 2011/0228511 A1 | 9/2011 | Weber |
| 2011/0242661 A1 | 10/2011 | Simmonds |
| 2012/0062998 A1 | 3/2012 | Schultz et al. |
| 2012/0069547 A1 | 3/2012 | Gielen et al. |
| 2012/0147361 A1 | 6/2012 | Mochizuki et al. |
| 2012/0179369 A1 | 7/2012 | Lapidot et al. |
| 2012/0194781 A1 | 8/2012 | Agurok |
| 2012/0218301 A1 | 8/2012 | Miller |
| 2012/0281389 A1 | 11/2012 | Panagotacos et al. |
| 2012/0287621 A1 | 11/2012 | Lee et al. |
| 2013/0016292 A1 | 1/2013 | Miao et al. |
| 2013/0022316 A1 | 1/2013 | Pelletier et al. |
| 2013/0038933 A1 | 2/2013 | Wang |
| 2013/0120986 A1 | 5/2013 | Xi |
| 2013/0135749 A1 | 5/2013 | Akutsu et al. |
| 2013/0187836 A1 | 7/2013 | Cheng |
| 2013/0201690 A1 | 8/2013 | Vissenberg et al. |
| 2013/0208362 A1 | 8/2013 | Bohn et al. |
| 2013/0208498 A1 | 8/2013 | Ouderkirk |
| 2013/0215361 A1 | 8/2013 | Wang |
| 2013/0229717 A1 | 9/2013 | Amitai |
| 2013/0242392 A1 | 9/2013 | Amirparviz et al. |
| 2013/0276960 A1 | 10/2013 | Amitai |
| 2013/0279017 A1 | 10/2013 | Amitai |
| 2013/0334504 A1 | 12/2013 | Thompson et al. |
| 2014/0003762 A1 | 1/2014 | Macnamara |
| 2014/0016051 A1 | 1/2014 | Kroll |
| 2014/0043688 A1 | 2/2014 | Schrader et al. |

(56) References Cited

U.S. PATENT DOCUMENTS

| | | |
|---|---|---|
| 2014/0104665 A1 | 4/2014 | Popovich |
| 2014/0104852 A1 | 4/2014 | Duong et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0177049 A1 | 6/2014 | Beck |
| 2014/0019801 A1 | 7/2014 | Lamb et al. |
| 2014/0192539 A1 | 7/2014 | Yriberri et al. |
| 2014/0226215 A1 | 8/2014 | Komatsu |
| 2014/0226361 A1 | 8/2014 | Vasylyev |
| 2014/0240834 A1 | 8/2014 | Mason |
| 2014/0264420 A1 | 9/2014 | Edwards et al. |
| 2014/0293434 A1 | 10/2014 | Cheng |
| 2014/0334126 A1 | 11/2014 | Speier et al. |
| 2014/0334777 A1 | 11/2014 | Dubroca et al. |
| 2014/0374377 A1 | 12/2014 | Schulz |
| 2015/0009682 A1 | 1/2015 | Clough |
| 2015/0009687 A1 | 1/2015 | Lin |
| 2015/0016777 A1 | 1/2015 | Abovitz et al. |
| 2015/0049486 A1 | 2/2015 | Jung et al. |
| 2015/0098206 A1 | 4/2015 | Pickard et al. |
| 2015/0103151 A1 | 4/2015 | Carls et al. |
| 2015/0138451 A1 | 5/2015 | Amitai |
| 2015/0153569 A1 | 6/2015 | Yonekubo |
| 2015/0160529 A1 | 6/2015 | Popovich et al. |
| 2015/0182348 A1 | 7/2015 | Siegal et al. |
| 2015/0182748 A1 | 7/2015 | Gefen et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0207990 A1 | 7/2015 | Ford |
| 2015/0219834 A1 | 8/2015 | Nichol et al. |
| 2015/0247617 A1 | 9/2015 | Du et al. |
| 2015/0028976 A1 | 10/2015 | Popovitch et al. |
| 2015/0277127 A1 | 10/2015 | Amitai |
| 2015/0293360 A1 | 10/2015 | Amitai |
| 2016/0041387 A1 | 2/2016 | Valera et al. |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0215956 A1 | 7/2016 | Smith et al. |
| 2016/0234485 A1 | 8/2016 | Robbins et al. |
| 2016/0313567 A1 | 10/2016 | Kurashige |
| 2016/0327906 A1 | 11/2016 | Futterer |
| 2016/0341964 A1 | 11/2016 | Amitai |
| 2016/0349518 A1 | 12/2016 | Amitai et al. |
| 2016/0370534 A1 | 12/2016 | Liu et al. |
| 2017/0003504 A1 | 1/2017 | Vallius |
| 2017/0045666 A1 | 2/2017 | Vasylyev |
| 2017/0045744 A1 | 2/2017 | Amitai |
| 2017/0052376 A1 | 2/2017 | Amitai |
| 2017/0052377 A1 | 2/2017 | Amitai |
| 2017/0122725 A1 | 5/2017 | Yeoh |
| 2017/0176755 A1 | 6/2017 | Cai |
| 2017/0242249 A1 | 8/2017 | Wall |
| 2017/0276947 A1 | 9/2017 | Yokoyama |
| 2017/0299860 A1 | 10/2017 | Wall et al. |
| 2017/0336636 A1 | 11/2017 | Amitai et al. |
| 2017/0343822 A1 | 11/2017 | Border et al. |
| 2017/0353714 A1 | 12/2017 | Poulard et al. |
| 2017/0357095 A1 | 12/2017 | Amitai |
| 2017/0363799 A1 | 12/2017 | Ofir et al. |
| 2018/0003862 A1 | 1/2018 | Benitez |
| 2018/0039082 A1 | 2/2018 | Amitai |
| 2018/0067315 A1 | 3/2018 | Amitai et al. |
| 2018/0101087 A1 | 4/2018 | Shinohara |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0275409 A1 | 9/2018 | Gao et al. |
| 2018/0292592 A1 | 10/2018 | Danziger |
| 2018/0292599 A1 | 10/2018 | Ofir et al. |
| 2018/0307014 A1 | 10/2018 | Tanaka |
| 2018/0372940 A1 | 12/2018 | Ishii et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Amitai |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278547 A1 | 9/2020 | Singer |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |

FOREIGN PATENT DOCUMENTS

| | | |
|---|---|---|
| CN | 1795399 | 6/2006 |
| CN | 101542346 | 9/2009 |
| CN | 101846799 A | 9/2010 |
| CN | 103837988 | 6/2014 |
| DE | 1422172 | 11/1970 |
| DE | 102013106392 | 12/2014 |
| EP | 0380035 | 8/1990 |
| EP | 0399865 | 11/1990 |
| EP | 0566004 | 10/1993 |
| EP | 0580952 | 2/1994 |
| EP | 1096293 | 5/2001 |
| EP | 1158336 | 11/2001 |
| EP | 1326102 | 7/2003 |
| EP | 1385023 | 1/2004 |
| EP | 1562066 | 8/2005 |
| FR | 2496905 | 6/1982 |
| FR | 2638242 | 4/1990 |
| GB | 1321303 | 6/1973 |
| GB | 1514977 | 6/1978 |
| GB | 2220081 | 12/1989 |
| GB | 2278888 | 12/1994 |
| GB | 2495398 | 4/2013 |
| JP | 04-159503 | 6/1992 |
| JP | 08-313843 | 11/1996 |
| JP | 9-258962 | 10/1997 |
| JP | 2002539498 | 11/2002 |
| JP | 2003140081 | 5/2003 |
| JP | 2003149643 | 5/2003 |
| JP | 2003536102 | 12/2003 |
| JP | 2004527801 | 9/2004 |
| JP | 2005084522 | 3/2005 |
| JP | 2006145644 | 6/2006 |
| JP | 2011221235 | 11/2011 |
| JP | 2012-37761 u | 2/2012 |
| JP | 2012123936 | 6/2012 |
| JP | 2012163659 | 8/2012 |

(56) References Cited

FOREIGN PATENT DOCUMENTS

| | | |
|---|---|---|
| JP | 2012-198263 | 10/2012 |
| JP | 2016028275 | 2/2016 |
| KR | 101470387 | 12/2014 |
| TW | 201809798 | 3/2018 |
| WO | 9314393 | 7/1993 |
| WO | 9510106 | 4/1995 |
| WO | 9815868 | 4/1998 |
| WO | 0055676 | 9/2000 |
| WO | 0127685 | 4/2001 |
| WO | 0195027 | 12/2001 |
| WO | 02082168 | 10/2002 |
| WO | 02088825 | 11/2002 |
| WO | 02097515 | 12/2002 |
| WO | 03058320 | 7/2003 |
| WO | 03081320 | 10/2003 |
| WO | 2004053541 | 6/2004 |
| WO | 2005024485 | 3/2005 |
| WO | 2005024491 | 3/2005 |
| WO | 2005024969 | 3/2005 |
| WO | 2005093493 | 10/2005 |
| WO | 2005124427 | 12/2005 |
| WO | 2006013565 | 2/2006 |
| WO | 2006061927 | 6/2006 |
| WO | 2006085308 | 8/2006 |
| WO | 2006085309 | 8/2006 |
| WO | 2006085310 | 8/2006 |
| WO | 2006087709 | 8/2006 |
| WO | 2007054928 | 5/2007 |
| WO | 2007093983 | 8/2007 |
| WO | 2008023367 | 2/2008 |
| WO | 2008129539 | 10/2008 |
| WO | 2008149339 | 12/2008 |
| WO | 2009074638 | 6/2009 |
| WO | 2011130720 | 10/2011 |
| WO | 2013065656 | 5/2013 |
| WO | 2013175465 | 11/2013 |
| WO | 2013188464 | 12/2013 |
| WO | 2014076599 | 5/2014 |
| WO | 2014155096 | 10/2014 |
| WO | 2015012280 | 1/2015 |
| WO | 2015081313 | 6/2015 |
| WO | 2016103251 | 6/2016 |
| WO | 2016132347 | 8/2016 |
| WO | 2017106873 | 6/2017 |
| WO | 2018138714 | 8/2018 |

\* cited by examiner

COMPACT COLLIMATING OPTICAL DEVICE AND SYSTEM

CROSS-REFERENCE TO RELATED APPLICATIONS

This application claims the benefit of U.S. provisional patent application (PPA) Ser. No. 62/689,900, filed Jun. 26, 2018 by the present inventors, which is incorporated by reference in its entirety herein.

FIELD OF THE INVENTION

The present invention relates to optical systems and, in particular, it concerns an optical system with a compact collimating image projector.

BACKGROUND OF THE INVENTION

Compact optical devices are particularly needed in the field of head-mounted displays (HMDs), wherein an optical module performs functions of image generation (an "imager") and collimation of the image to infinity, for delivery to the eye of a viewer. The image can be obtained from a display device, either directly from a spatial light modulator (SLM), such as a cathode ray tube (CRT), a liquid crystal display (LCD), a liquid crystal on silicon (LCoS), a digital micro-mirror device (DMD), an OLED display, a micro-LED array, a scanning source or similar devices, or indirectly, by means of a relay lens or an optical fiber bundle. The image, made up of an array of pixels, is focused to infinity by a collimating arrangement and transmitted into the eye of the viewer, typically by a reflecting surface or a partially reflecting surface acting as a combiner, for non-see-through applications and see-through applications, respectively. Typically, a conventional, free-space optical module is used for these purposes.

As the desired field-of-view (FOV) of the system increases, conventional optical modules of this type become heavier and bulkier, and hence impractical, even for a moderate performance device. This is a major drawback for all kinds of displays, but especially in head mounted applications, where the system must necessarily be as light and compact as possible.

The quest for compactness has led to several different complex optical solutions, many of which are still not sufficiently compact for most practical applications, and at the same time, suffer drawbacks in terms of cost, complexity, and manufacturability. In some cases, the eye-motion-box (EMB) over which the full range of optical viewing angles is visible is small, for example, less than 6 mm, rendering performance of the optical system sensitive to even small movements of the optical system relative to the eye of the viewer, and failing to accommodate sufficient pupil motion for comfortable reading of text from such displays.

A particularly advantageous family of solutions for HMDs and near-eye displays are commercially available from Lumus Ltd. (Israel), typically employing light-guide substrates (lightguide optical elements [LOE], lightguides, waveguides) with at least one set of partially reflecting surfaces or other applicable optical elements for delivering an image to the eye of a user. Various aspects of the Lumus Ltd. technology are described in the following PCT patent publications, which are hereby incorporated by reference as providing relevant background to the present invention: WO 01/95027, WO 2006/013565, WO 2006/085309, WO 2006/085310, WO 2007/054928, WO 2008/023367, and WO 2008/129539.

SUMMARY

According to the teachings of the present embodiment there is provided an optical system including: an arrangement of optical components including: a first polarization-selective reflector (PSR) (PBS-A), a second PSR (PBS-B), and a lightguide (124), the arrangement of optical components defining a light path, the light-path defined at least in part by light: propagating (L6) toward the first PSR (PBS-A), traversing (L6) the first PSR (PBS-A), then traversing in a first direction (L6) the second PSR (PBS-B), and then reflecting from a second direction (L7) from the second PSR (PBS-B) in an output image direction (L8), and wherein the second PSR (PBS-B) is inclined (PRISM-BA) with respect to the first PSR (PBS-A) so the output image direction (L8) is into the lightguide (124).

In an optional embodiment, the first polarization-selective reflector (PSR) (PBS-A) is associated with a third surface (A3) of a first prism (PRISM-A), the first prism further including an entrance surface (A1), the entrance surface (A1) having a normal corresponding to a first rectangular axis (A1N) of the first PSR (PBS-A), and the first prism further including a second surface (A2), the second surface (A2) perpendicular to the entrance surface (A1), and the second surface (A2) having a normal corresponding to a second rectangular axis (A2N) of the first PSR (PBS-A), and the second PSR (PBS-B) is inclined (PRISM-BA) with respect to the first PSR (PBS-A) so the output image direction (L8) is oblique to the first and second rectangular axes (A1N, A2N) of the first PSR (PBS-A).

According to the teachings of the present embodiment there is provided an optical system including: an arrangement of optical components including: a first polarization-selective reflector (PSR) (PBS-A), associated with a third surface (A3) of a first prism (PRISM-A), the first prism further including an entrance surface (A1), the entrance surface having a normal corresponding to a first rectangular axis (A1N) of the first PSR, and the first prism further including a second surface (A2), the second surface perpendicular to the entrance surface, and the second surface having a normal corresponding to a second rectangular axis (A2N) of the first PSR, and a second PSR (PBS-B), the arrangement of optical components defining a light path, the light-path defined at least in part by light: propagating toward the first PSR (L6) traversing the first PSR (L6), then traversing in a first direction (L6) the second PSR, and then reflecting from a second direction (L7) from the second PSR in an output image direction (L8), and wherein the second PSR is inclined (PRISM-BA) with respect to the first PSR so the output image direction is oblique to the first and second rectangular axes of the first PSR.

In an optional embodiment, the third surface is substantially at a 45-degree angle to both the first and second rectangular axes.

In another optional embodiment, the arrangement of optical components further includes a collimator (101), the collimator configured in the light-path.

In another optional embodiment, the collimator includes a lens (120) having a lens optical axis (120N), the arrangement of optical components includes a reflective element (122) configured in the light-path, and wherein a normal (122N) to a surface of the reflective element is inclined (122A) with respect to the first and second rectangular axes of the first PSR.

In another optional embodiment, the reflective element is a mirror. In another optional embodiment, the reflective element is a lens (420). In another optional embodiment, the normal (PBS-AN) to the first PSR is at an angle (PBS-AA) of 45® (degrees) relative to the lens optical axis (120N).

In another optional embodiment, further including:
an image light provider (110) providing image input light (L4),
the light-path including the image input light (L4),
the collimator being deployed in the light-path downstream from the image light provider (110) and upstream of the first PSR, the collimator including:
  a first quarter-wave plate (WAVE-A) adjacent to the lens, the first prism (PRISM-A) having:
    the entrance surface (A1) accepting the image input light, and
    the second surface (A2) adjacent to the first quarter-wave plate (WAVE-A), and
    the third surface (A3) adjacent to the first PSR (PBS-A),
  a second prism (PRISM-B) having:
    a fourth surface (B1) adjacent to the first PSR (PBS-A), and
    a fifth surface (B2) adjacent to the second PSR (PBS-B),
  a second quarter-wave plate (WAVE-B) adjacent to the reflective element (122), and a third prism (PRISM-C) having:
    a seventh surface (C1) adjacent to the second PSR (PBS-B),
    an eighth surface (C2) adjacent to the second quarter-wave plate (WAVE-B), and
    a ninth surface (C3)
  configured such that the light-path includes
    the image input light (LA) entering the first prism via the entrance surface (A1),
    reflecting (L5) from the first PSR, traversing the first quarter-wave plate (WAVE-A),
    reflecting (L6) from the lens (120), re-traversing the first quarter-wave plate, the first prism, through the first PSR, the second prism, the second PSR in a first direction, the third prism, the second quarter-wave plate,
    reflecting (L7) from the mirror, re-traversing the second quarter-wave plate, the third prism,
    reflecting (L8) from the second direction of the second PSR, traversing the third prism, and
    output of the light-path from the ninth surface (C3) in the output image direction.

In another optional embodiment, further including: a lightguide substrate (124) with at least two major parallel external surfaces and at least one set of partially reflecting internal surfaces, configured such that the light-path output from the ninth surface (C3) enters the lightguide substrate.

In another optional embodiment, the light-path includes an input of uncollimated image light.

In another optional embodiment, the collimator is deployed in the light-path between the first PSR and the second PSR.

In another optional embodiment, the collimator is deployed in the light-path downstream from the second PSR.

In another optional embodiment, the light reflected from the second PSR (PBS-B) is collimated light corresponding to an image.

In another optional embodiment, wherein after being reflected from the second PSR (PBS-B), the collimated light is then output from the system.

In another optional embodiment, wherein the output image direction is within a given range of angles with respect to a normal (D2N) to an output surface of the system.

BRIEF DESCRIPTION OF FIGURES

The embodiment is herein described, by way of example only, with reference to the accompanying drawings, wherein.

Figure 1:
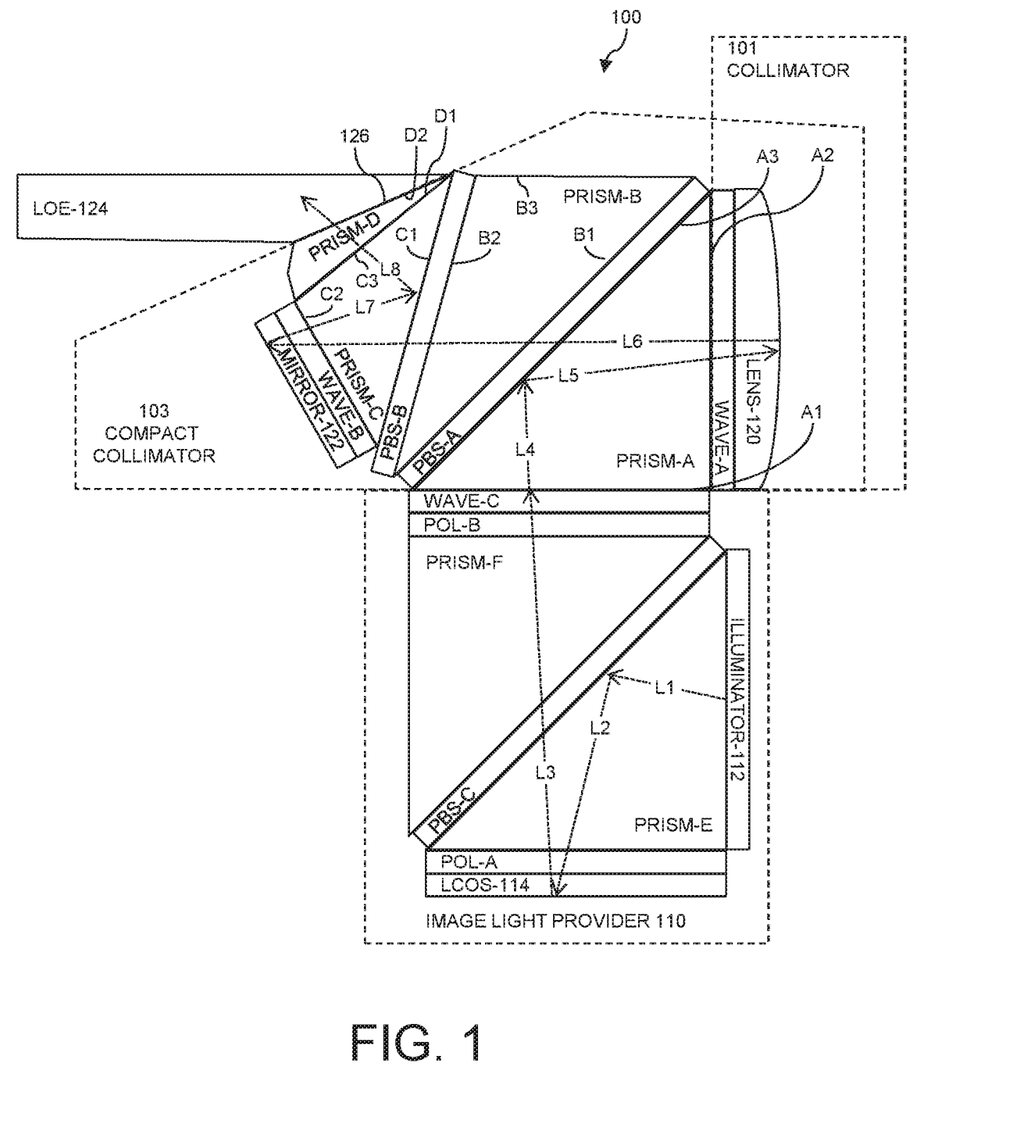
FIG. 1, there is shown a first sketch of an optical system
FIG. 2, there is shown a second sketch of the optical system, showing optical axes and angles.
Figure 2:
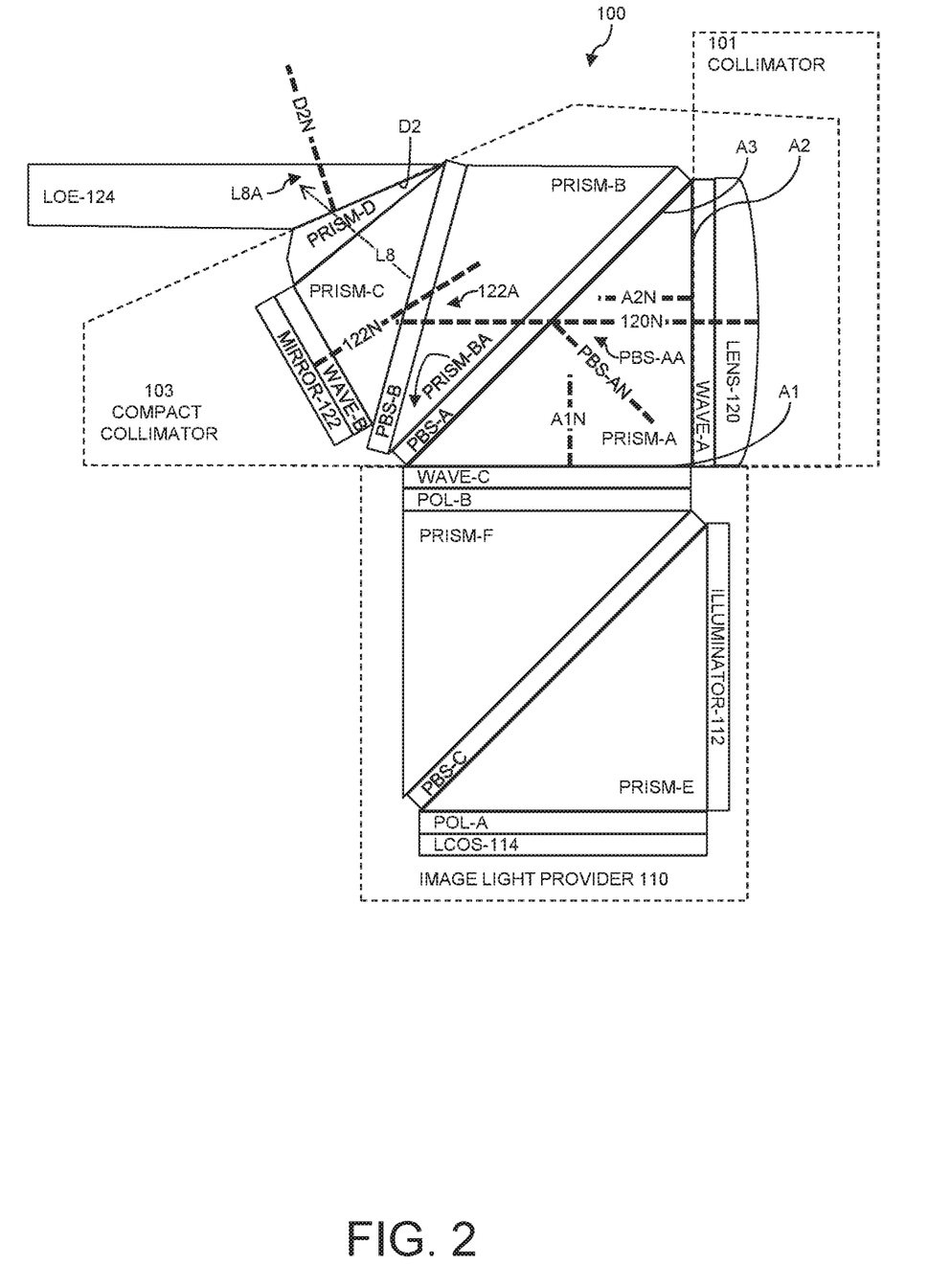

DETAILED DESCRIPTION—FIRST EMBODIMENT—FIG. 1 TO FIG. 2

The principles and operation of the system according to a present embodiment may be better understood with reference to the drawings and the accompanying description. A present invention is a compact optical system for projecting light, in particular collimated light into an optical element. A feature of the current embodiment is the use of a pair of non-parallel polarization-selective reflectors forming a wedge-like configuration (non-parallel) within a single prism block to output an image of collimated light. Given a main beam splitter (a polarization-selective reflector, PSR) in a projector prism, the use of an extra PSR inclined relative to the main PSR, more specifically inclined with respect to rectangular axes of the main PSR, provides an extra degree of freedom in adjusting the output beam angle of the collimated image light, for example, for coupling into an LOE. The output beam angle of the light output from the system can be within a given range of angles with respect to a normal to an output surface of the system.

Referring to FIG. 1, there is shown a first sketch of an optical system, generally designated 100, constructed and operative according to various aspects of the present invention. For simplicity and clarity in the figure and description, the interfaces, for example the interfaces between prisms providing beam splitting, are shown as individual elements polarization-selective reflectors (PSR). For simplicity of reference in this description and figures, without limitation, the polarization-selective reflectors are shown as a typical implementation of polarized beam splitters (PBS). It will be obvious to one skilled in the art that the polarization-selective reflectors/PSRs/PBSs can be implements using a variety of techniques, including but not limited to multiple layers of dielectric coatings and wire-grid metallic strips such as those made by Moxek, as distinct elements or integrated into the prisms. In a case where the PBS is a coating, the coating is applied to one or more surfaces of one or more prisms, and then the prisms can be optically attached to each other (for example, cemented together). In this case, the PBS may not be a distinct element (described as "adjacent" in the below description), however the use of the term "adjacent" for describing configurations will be obvious to one skilled in the art. Any combination of the above-described implementations for the PBS can be used, as appropriate. For example, a combination of coatings and/or wire-grids to provide different selections of polarizations for a single interface, each selection in a different direction (opposite sides of the interface to transmit/reflect light propagating toward each side of the interface).

The use of the terms "traversing" and "reflecting" with regard to PBSs are as normally used in the art to describe the interaction of light with a PBS. For example, the majority of the light arriving at a first surface (side) of a PBS will (traverse) continue to propagate from a second surface (side) of the PBS, or (reflect) be returned to propagate away from the first surface of the PBS. One skilled in the art knows that the physics of these interactions can include absorption, refraction, transmission, etc.

The current figures are not to scale, including orientations and angles of elements and light-path, as well as simplifying the light-path and not showing refractions at interfaces. The light-path is depicted by only one light ray/light beam. Generally, wherever an image is represented herein by a light beam, it should be noted that the beam is a sample beam of the image, which typically is formed by multiple beams at slightly differing angles each corresponding to a point or pixel of the image. The rays illustrated are typically a centroid of the image. That is, the light corresponds to an image and the central ray is a center ray from a center of the image or a central pixel of the image Designators for the light-path (L1, L3, L6, etc.) are also used for the type of light travelling the corresponding section of the light-path (illumination, polarized image light, collimated light of the image, etc.). This reference to light-path or type of light will be obvious to one skilled in the art from the context of use.

In general, the optical system 100 includes a compact collimator 103 including at least two polarization-selective reflectors (PRSs) including a first PSR (PBS-A), and a second PSR (PBS-B). A light-path is defined at least in part by light traversing the first PSR (PBS-A), then traversing the second PSR (PBS-B) in a first direction, and then reflecting from the second PSR (PBS-B) from a second direction.

Refer also to FIG. 2, there is shown a second sketch of the optical system 100, showing optical axes and angles. A significant feature is that a collimator (101, collimating element, collimated light source) is deployed in the light-path and the first PSR (PBS-A) is non-parallel to the second PSR (PBS-B). In other words, there is a (non-zero) angle (PRISM-BA), typically oblique, between the first and second PSRs (PBS-A and PBS-B). The collimator provides collimated image radiation, that is, light corresponding to an image.

To assist the reader, note that in this description generally the suffix "A" is used for elements that are angles, and the suffix "N" is used for elements that are normals.

An exemplary implementation of the optical system 100 includes the collimator 101 including a first lens 120 having a lens optical axis (FIG. 2 120N) and a first ¼ wave plate (WAVE-A) adjacent to the first lens 120. A reflective optical element is typically implemented using a mirror, but this is non-limiting, and other components can be used, such as a lens, described below. For simplicity in this description a non-limiting example of a mirror 122 is used. In the current example, the mirror 122 is in the light-path subsequent to the second PSR (PBS-B). The reflective optical element has a normal (FIG. 2, 122N) to the surface of the reflective element. In this case, mirror 122 has a normal (122N) to the surface of the mirror 122. The normal 122N to the mirror is non-parallel to the lens optical axis 120N of the first lens 120. In other words, there is a (non-zero) angle 122A between the normal 122N and the lens optical axis 120N.

In a typical exemplary configuration, a normal (PBS-AN) to the first PSR (PBS-A) is at an angle (PBS-AA) of 45° (degrees) relative to the lens optical axis 120N of the first lens 120.

The input (L4) to the compact collimator 103 is uncollimated light. In an exemplary implementation, the image light is provided by an image light provider 110. The image light provider 110 can be implemented by components such as a liquid crystal display (LCD), a liquid crystal on silicon (LCoS), a digital micro-mirror device (DMD), an OLED display, and a micro-LED array.

An exemplary image light provider 110 is shown in FIG. 1 as including an illuminator 112 that provides illumination L1 via a fifth prism PRISM-E reflecting L2 from a third PBS (PBS-C) via an optional first polarizer POL-A to an LCOS 114. The reflection from the LCOS 114 is an (uncollimated) image (light) L3 that traverses the fifth prism PRISM-E, third PBS (PBS-C), sixth prism PRISM-F, and then a second polarizer POL-B and a ½-lambda third polarization waveplate WAVE-C. The resulting uncollimated image light L3 is output from the image light provider 110 into the compact collimator 103 via a light-wave entrance surface (A1) as the uncollimated input image light L4. The image light provider 110 and the compact collimator 103, can be adjacent (in contact with) each other, or aligned via a gap.

A first prism (PRISM-A) has a first surface as the light-wave entrance surface (A1) accepting the image light L4, and a second surface (A2) adjacent to the first quarter-wave plate (WAVE-A). The second surface (A2) is typically perpendicular to the first surface (A1). A third surface (A3) of the first prism (PRISM-A) is associated with (adjacent to) the first PSR (PBS-A). The entrance surface (A1) has a normal corresponding to a first rectangular axis (A1N) of the first PSR (PBS-A). The second surface (A2) is shown in a typical exemplary configuration being perpendicular to the entrance surface (A1), and the second surface (A2) has a normal corresponding to a second rectangular axis (A2N) of the first PSR (PBS-A). The second PSR (PBS-B) is inclined (PRISM-BA) with respect to the first PSR (PBS-A) so the output image direction L8 is oblique to the first (A1N) and second (A2N) rectangular axes of the first PSR (PBS-A).

A second prism (PRISM-B) has fourth surface (B1) adjacent to the first PSR (PBS-A), a fifth surface (B2) adjacent to the second PSR (PBS-B), and a sixth surface (B3) opposite the first prism (PRISM-A) entrance surface (A1).

A second quarter-wave plate (WAVE-B) is adjacent to the mirror 122.

A third prism (PRISM-C) has a seventh surface (C1) adjacent to the second PSR (PBS-B), an eighth surface (C2) adjacent to the second quarter-wave plate (WAVE-B), and a ninth surface (C3).

A fourth prism (PRISM-D) has a tenth surface (D1) adjacent to the ninth surface (C3), and an eleventh surface (D2).

In some implementations, prisms can be combined, for example, the third prism (PRISM-C) and the fourth prism (PRISM-D) can be constructed as a single prism.

In the current exemplary implementation, the light-path includes the image input light (L4) entering the first prism (PRISM-A) via the light-wave entrance surface (A1), and reflecting (L5) from the first PSR (PBS-A). The light-path of the reflected light (L5) traverses the first prism (PRISM-A) and the first quarter-wave plate (WAVE-A), reflecting (L6) from the first lens 120, re-traversing the first quarter-wave plate (WAVE-A), the first prism (PRISM-A), propagating (travelling) toward the first PSR (PBS-A), and through the first PSR (PBS-A) in a first direction (L6). Directions of the light-path refer to impinging on a side of the PSR. In the case of the first PSR (PBS-A), light travels toward a first side of the first PSR (PBS-A), from the first prism (PRISM-A), to the third surface (A3), traverses the first PSR (PBS-A) and exits the first PSR (PBS-A) from a second side of the first PSR that is adjacent/associated with fourth surface (B1) of the second prism (PRISM-B).

The light-path (L6) continues through the second prism (PRISM-B), the second PSR (PBS-B) in a first direction, the third prism (PRISM-C), and the second quarter-wave plate (WAVE-B). The light then reflects L7 from the mirror 122, re-traversing the second quarter-wave plate (WAVE-B), the third prism (PRISM-C), and reflecting output light L8 from a second direction from the second PSR (PBS-B), traversing the third prism (PRISM-C), the fourth prism (PRISM-D), and output from the eleventh surface (D2).

In the case of the second PSR (PBS-B), light travels toward a first side of the second PSR (PBS-B), that is, from the second prism (PRISM-B), to the fifth surface (B2), traverses the second PSR (PBS-B) and exits the second PSR ( ) from a second side of the second PSR (PBS-B) that is adjacent/associated with seventh surface (C1) of the third prism (PRISM-C). After reflection, light-path L7 impinges in a second direction on a second side of the second PSR (PBS-B), that is, from the third prism (PRISM-C), to the seventh surface (C1), reflects from the second side of the second PSR (PBS-B) as reflected output light L8.

A feature of this implementation is that output beam angle (L8A) of the output light (LS) (output image direction) from the system can be adjusted within a given range of angles with respect to a normal (FIG. 2, D2N) to an output surface (D2) of the system.

The output light L8 from the compact optical collimator 103 continues in the optical system 100 to enter a lightguide substrate (LOE, 124). Thus, the output image direction (LS) is into the lightguide (124). The LOE has at least two major parallel external surfaces and at least one set of partially reflecting internal surfaces, In the current exemplary implementation, the illuminator provides polarized light (s-polarized, s-pol) L1 that is reflected by the third PBS (PBS-C) to the light-path L2. The reflection of L2 from the LCOS 114 changes the polarization to p-polarized (p-pol) L3, and the ½-lambda third polarization waveplate WAVE-C changes the polarization to s-pol uncollimated input image light IA. The s-pol light L4 is reflected by the first PSR (PBS-A) to light-path L5 and emerges from two traversals of the first polarization waveplate WAVE-A in the collimated light source 101 as p-pol light L6. The p-pol light L6 traverses the first PSR (PBS-A) and second PSR (PBS-B), after which two traversals of the second waveplate WAVE-B result in s-pol light L7 that is reflected by the second PSR (PBS-B) and output as s-pol light L8 from the compact collimator 103.

Detailed Description—Alternative Embodiments—FIG. 3 to FIG. 8

In alternative implementations, one or more prisms, or all prisms may be omitted. For example, in FIG. 1, the optical system 100 can be constructed without first prism (PRISM-A), second prism (PRISM-B), and/or third prism (PRISM-C).

In alternative implementations, the collimating element (collimator) in the light-path is not upstream from the first PSR (PBS-A), but implemented by one or more elements in other locations along the light-path. In this case, the current figure's lens (120) could be replaced with a mirror. In another case, the light path L6 can be uncollimated input light.

Figure 3:
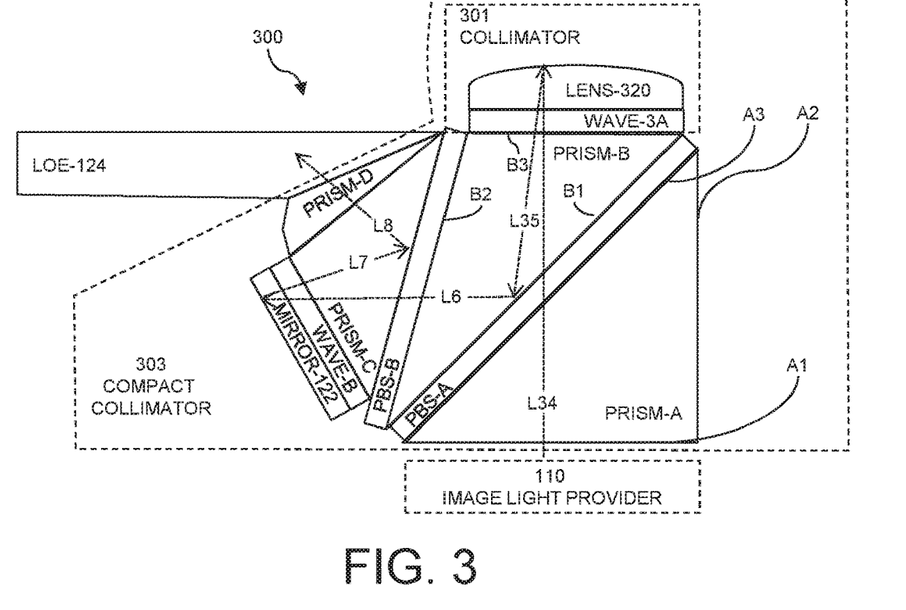
FIG. 3, there is shown a sketch of a first example of an alternative location of the collimator.

Referring to FIG. 3, there is shown a sketch of a first example of an alternative location of the collimator. In this first example optical system 300 of an alternative compact collimator 303, a collimator (collimated light source 301) can be deployed in the light-path between the first PSR (PBS-A) and the second PSR (PBS-B). The sixth surface (B3) of the second prism (PRISM-B) is adjacent to a third quarter-wave plate (WAVE-3A) that is in turn adjacent to a third lens (320). In the current example, the image light is shown as light-path L34 traversing the first PSR (PBS-A) and the third quarter-wave plate (WAVE-3A), reflecting (L35) from the third lens 320, re-traversing the third quarter-wave plate (WAVE-3A), the second prism (PRISM-B), reflecting from the first PSR (PBS-A) in the first direction (L6).

Figure 4:
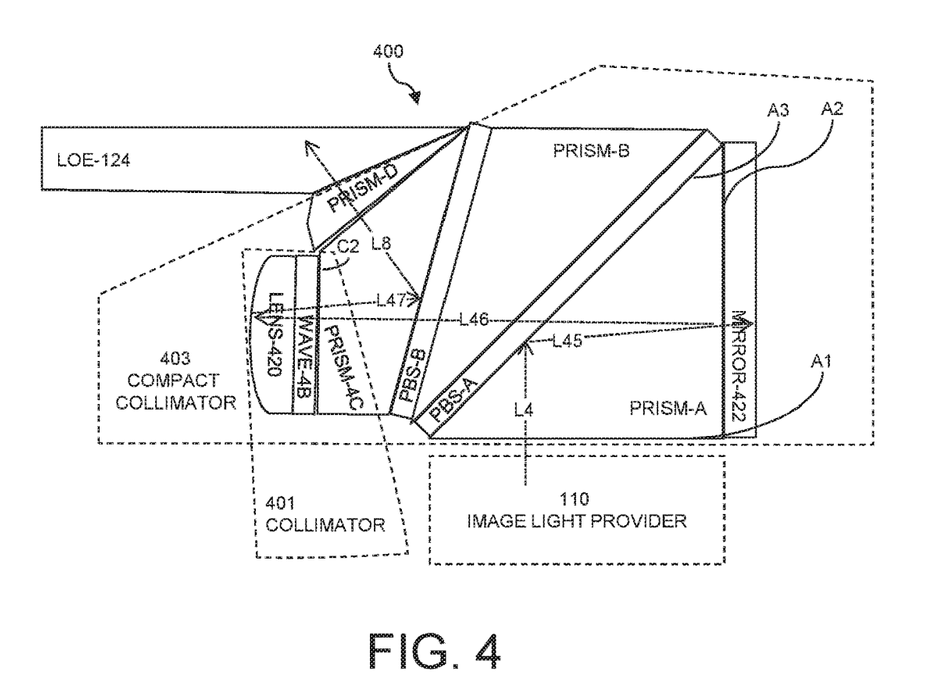
FIG. 4, there is shown a sketch of a second example of an alternative location of the collimator.

Referring to FIG. 4, there is shown a sketch of a second example of an alternative location of the collimator. In this second example 400 of an alternative compact collimator 403, a collimator (collimated light source 401) can be deployed in the light-path downstream from the second PSR (PBS-B). In the current figure, this second example replaces the first lens (120) with a fourth mirror (422) adjacent to the second surface (A2), and replaces the mirror 122 with a fourth quarter-wave plate (WAVE-4B) and a fourth lens 420 to implement the collimator (401). The third prism (PRISM-C) has been replaced with a prism (PRISM-4C), one edge of which is adjacent to the fourth quarter-wave plate (WAVE-4B).

In the current example, the image input light (L4) entering the first prism (PRISM-A) via the light-wave entrance surface (A1), is reflected (L45) from the first PSR (PBS-A). The light-path of the reflected light (L45) traverses the first prism (PRISM-A) and reflects (L46) from the fourth mirror (422), re-traversing the first prism (PRISM-A), propagating (travelling) toward the first PSR (PBS-A), and through the first PSR (PBS-A). The light-path (L46) continues through the second prism (PRISM-B), the second PSR (PBS-B) in a first direction, the prism (PRISM-4C), and the fourth quarter-wave plate (WAVE-4B). The light then reflects L47 from the fourth lens 420, re-traversing the fourth quarter-wave plate (WAVE-4B), the prism (PRISM-4C), and reflecting output light LB. A feature of this example is the collimator (401) [in particular, the surface of the fourth quarter-wave plate (WAVE-4B)] is non-adjacent, and at an angle to the eighth surface (C2) of the prism (PRISM-4C). The optical axis of the collimator (401) [the surface of the fourth quarter-wave plate (WAVE-4B)] is parallel to the optical axis of the fourth mirror (422)].

Figure 5:
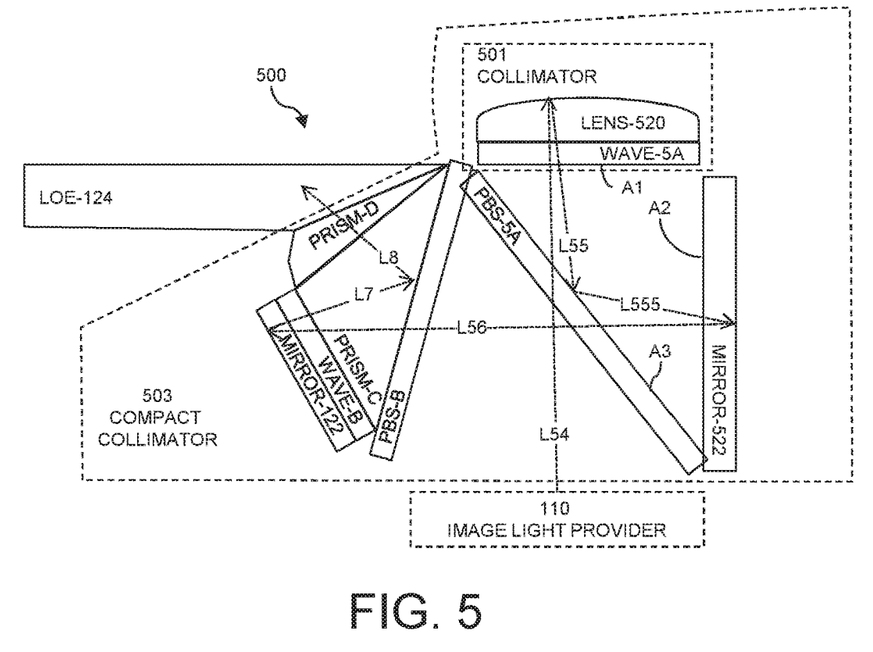
FIG. 5, there is shown a sketch of a third example of an alternative location of the collimator.

Referring to FIG. 5, there is shown a sketch of a third example of an alternative location of the collimator. In this third example optical system 500 of an alternative compact collimator 503, a collimator (collimated light source 501) can be deployed in the light-path at an alternative location with respect to the first PSR (PBS-A), now replaced with a fifth PSR (PBS-5A). In the current example, the image light is shown as light-path L54 traversing the fifth PSR (PBS-5A) and a fifth quarter-wave plate (WAVE-5A), reflecting (L55) from the fifth lens (520), reflecting from the fifth PSR (PBS-5A) as light-path L555, reflecting from a fifth mirror (522) as light-path L56 toward the second PSR (PSB-B). A feature of this example is the fifth PSR (PBS-5A) positioned generally rotated 90° from the orientation of the first PSR (PBS-A). In this example, the first prism (PRISM-A) is not used and the fifth quarter-wave plate (WAVE-5A) surface is similar to the entrance surface (A1) and the fifth mirror (522) surface is similar to the second surface (A2) having normals corresponding respectively to the first (A1N) and second (A2N) rectangular axes of the first PSR [in this example the fifth PSR (PBS-5A)].

Figure 6:
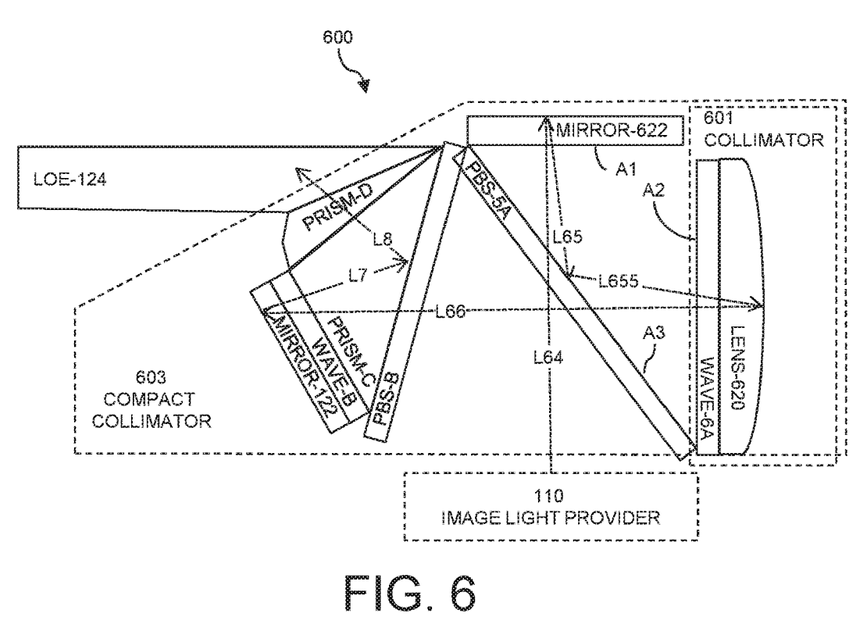
FIG. 6, there is shown a sketch of a fourth example of an alternative location of the collimator.

Referring to FIG. 6, there is shown a sketch of a fourth example of an alternative location of the collimator. In this fourth example optical system 600 of an alternative compact collimator 603, a collimator (collimated light source 601) can be deployed in the light-path at an alternative location with respect to the first PSR (PBS-A), now replaced with the fifth PSR (PBS-5A). In the current example, the image light is shown as light-path L64 traversing the fifth PSR (PBS-5A) and reflecting from a sixth mirror (522) as light path L65 that reflects from the fifth PSR (PBS-5A) as light-path L655 that then traverses a sixth quarter-wave plate (WAVE-6A), reflecting (L66) from a sixth lens (620) as light-path L66 toward the second PSR (PSB-B). In this example, the first prism (PRISM-A) is not used and the sixth mirror (622) surface is similar to the entrance surface (A1) and the sixth quarter-wave plate (WAVE-6A) surface is similar to the second surface (A2) having normals corresponding respectively to the first (A1N) and second (A2N) rectangular axes of the first PSR [in this example the fifth PSR (PBS-5A)].

Figure 7:
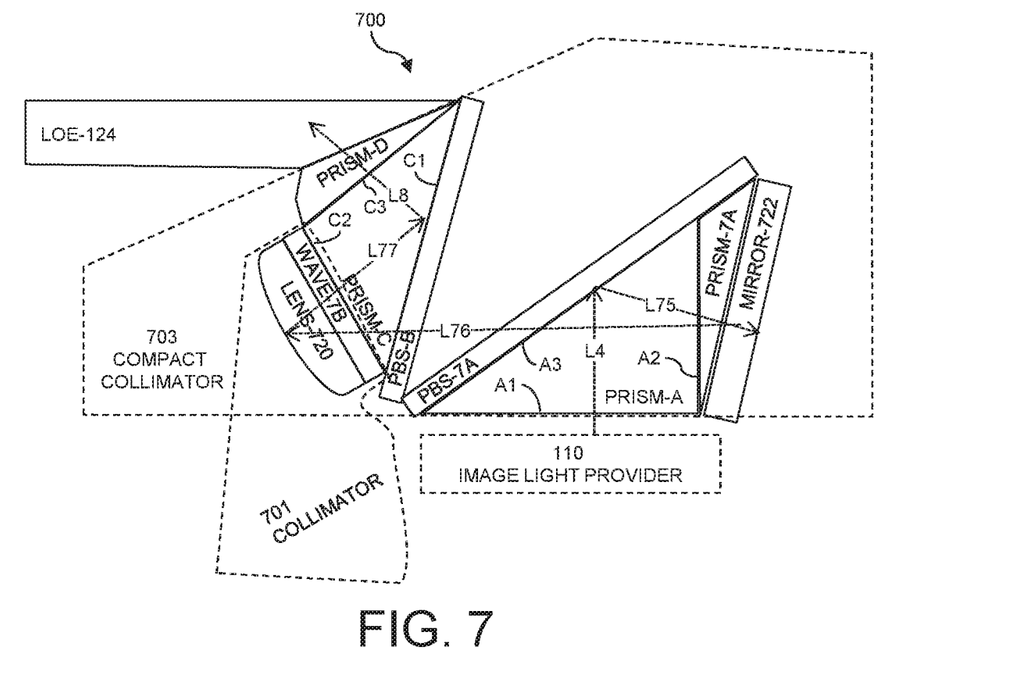
FIG. 7, there is shown a sketch of a fifth example of an alternative location of the collimator.

Referring to FIG. 7, there is shown a sketch of a fifth example of an alternative location of the collimator. In this fifth example 700 of an alternative compact collimator 703, a collimator (collimated light source 701) can be deployed in the light-path downstream from the second PSR (PBS-B). In the current figure, this fifth example replaces the first PSR (PBS-A) with a seventh PSR (PBS-7A) and replaces the first lens (120) with a seventh mirror (722), and replaces the mirror 122 with a seventh quarter-wave plate (WAVE-7B) and a seventh lens 720 to implement the collimator (701). Also, a seventh prism (PRISM-7A) is added adjacent to the first prism (PRISM-A) in order to adjoin with the seventh mirror (722). In the current example, two prisms [first prism (PRISM-A) and seventh prism (PRISM-7A)] are used to clarify the placement of the second surface (A2). In a case where a single prism is used [in place of first prism (PRISM-A) and seventh prism (PRISM-7A)] the second surface (A2) will be a construct line inside the single prism, still perpendicular to the entrance surface (A1).

In the current example, the image input light (L4) is reflected (L75) from the seventh PSR (PBS-7A). The light-path of the reflected light (L75 reflects (L76) from the seventh mirror (422), propagating toward the seventh PSR (PBS-7A), and through the seventh PSR (PBS-7A). The light-path (L76) continues through the second PSR (PBS-B) in a first direction, the third prism (PRISM-C), and the seventh quarter-wave plate (WAVE-7B). The light then reflects L77 from the seventh lens 720, re-traversing the seventh quarter-wave plate (WAVE-7B), the third prism (PRISM-C), and reflecting output light L8. A feature of this example is that the collimator (701) [in particular, the surface of the seventh quarter-wave plate (WAVE-7B)] is adjacent, to the eighth surface (C2) of the third prism (PRISM-C). In addition, unlike the first PSR (PBS-A) that is typically at 45° relative to the incoming image light path L4, the seventh PSR (PBS-7A) is at an angle other than 45° relative to the incoming image light path L4, and the seventh mirror (722) is correspondingly at an angle other than 45° relative to the seventh PSR (PBS-7A) in order to align the propagating light path (L76) for collimation by the collimator 701. In this example the second surface (A2) is not adjacent to the seventh mirror (722), as the seventh mirror (722) is at an oblique angle relative to the entrance surface (A1).

Figure 8:
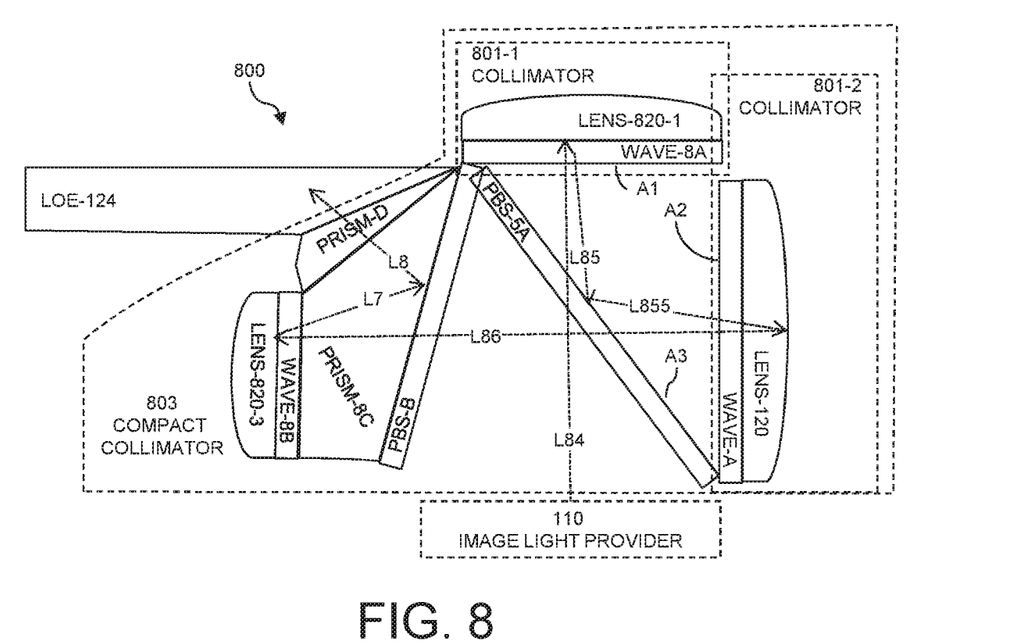
FIG. 8, there is shown a sketch of a sixth example of an alternative location of the collimator.

Referring to FIG. 8, there is shown a sketch of a sixth example of an alternative location of the collimator. In this sixth example 800 of an alternative compact collimator 803, a collimator (collimated light source 801) can be deployed as components in several locations. In the current figure, this example maintains the first quarter-wave plate (WAVE-A) and the first lens (120) as a ninth collimator (801-2), however, as will be described, now in a different location in the light-path. An eighth quarter-wave plate (WAVE-8A) and an eighth lens (820-1) are added as an eighth collimator (801-1). The mirror 122 is replaced with a ninth quarter-wave plate (WAVE-8B) and corresponding ninth lens 820-3 thus implementing the collimator (401). The third prism (PRISM-C) has been replaced with an eighth prism (PRISM-8C), one edge of which is adjacent to the ninth quarter-wave plate (WAVE-8B).

In the current example, the image input light (L84) traverses the fifth PSR (PBS-5A) and the eighth quarter-wave plate (WAVE-8A) reflecting from the eighth lens (820-1) as light-path L85 that reflects from the fifth PRS (PBS-5A) as light-path L855, traverses the first quarter-wave plate (WAVE-A) reflecting from the first lens (120) as light-path L86 that re-traverses the fifth PRS (PBS-5A), traversing the eighth prism (PRISM-8C), and the ninth quarter-wave plate (WAVE-8B). The light then reflects L7 from the ninth lens 820-3, re-traversing the ninth quarter-wave plate (WAVE-8B), the eighth prism (PRISM-8C), and reflecting output light LS. A feature of this example is using multiple quarter-wave plates and lenses. In this example, the first prism (PRISM-A) is not used and the eighth quarter-wave plate (WAVE-8A) surface is similar to the entrance surface (A1) and the first quarter-wave plate (WAVE-A) is the second surface (A2) having normals corresponding respectively to the first (A1N) and second (A2N) rectangular axes of the first PSR [in this example the fifth PSR (PBS-5A)].

Typically, the light reflected from the second PSR (PBS-B) is collimated light corresponding to an image. After the light L7 is reflected from the second PSR (PBS-B), the collimated output light L8 is then output from the compact collimator 103 apparatus.

In various embodiments, it is possible to deploy between one and three lenses in each of the outer ribs of the assembly (compact collimator). For example, the optical system 100 includes one lens, and the sixth example 800 includes three lenses.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. An optical system comprising an arrangement of optical components defining a light-path, said system comprising:
   (a) an image light provider providing image input light;
   (b) a collimator comprising a lens having an optical axis and a first quarter wave plate, the collimator deployed downstream of the image light provider;
   (c) a first polarization selective reflector (PSR) deployed downstream of the collimator;
   (d) a first prism comprising an entrance surface having a normal corresponding to a first rectangular axis of the first PSR, a second surface adjacent to the first quarter-wave plate and having a normal corresponding to a second rectangular axis of the first PSR, and a third surface adjacent to the first PSR;
   (e) a second PSR inclined with respect to the first PSR;
   (f) a second prism comprising a fourth surface adjacent to the first PSR and a fifth surface adjacent to the second PSR;
   (g) a third prism comprising a seventh surface adjacent to the second PSR and an eighth surface adjacent to a second quarter-wave plate, and a ninth surface; and
   (h) a reflective element inclined with respect to the first and second rectangular axes of the first PSR,
   wherein the light-path is defined at least in part by light:
   (i) propagating toward said first PSR,
   (ii) traversing said first PSR,
   (iii) then traversing in a first direction said second PSR, and
   (iv) then reflecting from a second direction from said second PSR in an output image direction, wherein the output image direction is oblique to the first and second rectangular axes of the first PSR.

2. The optical system of claim 1, wherein a normal to the first PSR is substantially at an angle of 45 degrees relative to said optical axis.

3. The optical system of claim 1, further comprising a fourth prism having a tenth surface adjacent to said ninth surface and an eleventh surface, wherein a light-path output from the ninth surface traverses the fourth prism and is output from the eleventh surface in an output image direction.

4. The optical system of claim 1, further comprising a lightguide substrate with at least two major parallel external surfaces and at least one set of partially reflecting internal surfaces, wherein the light-path output from the ninth surface enters the lightguide substrate.

5. The optical system of claim 1, wherein said reflective element is a mirror.

6. The optical system of claim 1, wherein said reflective element is a lens.

7. The optical system of claim 1, wherein said light-path includes an input of uncollimated image light.

8. The optical system of claim 1, wherein light reflected from said second PSR is collimated light corresponding to an image.

9. The optical system of claim 8, wherein after being reflected from said second PSR, said collimated light is then output from the system.

10. The optical system of claim 1, wherein said output image direction is within a given range of angles with respect to a normal to an output surface of the system.

11. The optical system of claim 1, wherein at least one of said first and second polarization-selective reflectors comprises a beam splitter.

12. The optical system of claim 1, wherein the image light provider comprises a component selected from a group consisting of a spatial light modulator (SLM), a liquid crystal display (LCD), a liquid crystal on silicon (LCoS), a digital micro-mirror device (DMD), an organic light-emitting diode (LED) display, a micro-LED array, and an optical fiber bundle.

* * * * *